United States Patent
Zhu et al.

(10) Patent No.: US 9,117,006 B2
(45) Date of Patent: Aug. 25, 2015

(54) RECOMMENDING KEYWORDS

(71) Applicant: Alibaba Group Holding Limited, George Town (KY)

(72) Inventors: Daoyong Zhu, Hangzhou (CN); Fangying Dong, Hangzhou (CN)

(73) Assignee: Alibaba Group Holding Limited (KY)

( * ) Notice: Subject to any disclaimer, the term of this patent is extended or adjusted under 35 U.S.C. 154(b) by 201 days.

(21) Appl. No.: 13/866,953

(22) Filed: Apr. 19, 2013

(65) Prior Publication Data

US 2013/0290320 A1    Oct. 31, 2013

(30) Foreign Application Priority Data

Apr. 25, 2012 (CN) .......................... 2012 1 0125441

(51) Int. Cl.
*G06F 17/30* (2006.01)

(52) U.S. Cl.
CPC .... *G06F 17/30979* (2013.01); *G06F 17/30861* (2013.01)

(58) Field of Classification Search
CPC ................ G06F 17/30979; G06F 17/30861
USPC ..................................................... 707/723
See application file for complete search history.

(56) References Cited

U.S. PATENT DOCUMENTS

| | | | | |
|---|---|---|---|---|
| 5,694,559 A * | 12/1997 | Hobson et al. | ................ | 715/705 |
| 5,799,284 A * | 8/1998 | Bourquin | .................... | 705/14.54 |
| 5,892,843 A * | 4/1999 | Zhou et al. | .................... | 382/176 |
| 6,006,225 A * | 12/1999 | Bowman et al. | ....................... | 1/1 |
| 6,119,101 A * | 9/2000 | Peckover | .................... | 705/7.31 |
| 6,144,958 A * | 11/2000 | Ortega et al. | ......................... | 1/1 |
| 6,169,986 B1 * | 1/2001 | Bowman et al. | ........................ | 1/1 |
| 7,636,714 B1 * | 12/2009 | Lamping et al. | ....................... | 1/1 |
| 8,392,441 B1 * | 3/2013 | Papachristou et al. | ........ | 707/759 |
| 8,583,635 B1 | 11/2013 | Nanno et al. | | |
| 2005/0198068 A1 | 9/2005 | Mukherjee et al. | | |
| 2007/0011154 A1* | 1/2007 | Musgrove et al. | ............... | 707/5 |
| 2007/0088695 A1* | 4/2007 | Bleyendaal et al. | ............. | 707/5 |
| 2008/0115076 A1* | 5/2008 | Frank et al. | ................... | 715/771 |
| 2009/0024612 A1* | 1/2009 | Tang et al. | ........................ | 707/5 |
| 2011/0264682 A1 | 10/2011 | Song et al. | | |
| 2012/0117102 A1* | 5/2012 | Meyerzon et al. | ........... | 707/767 |

(Continued)

OTHER PUBLICATIONS

Bashir, Shariq, et al., "Improving Retrievability of Patents in Prior-Art Search", ECIR 2010, LNCS 5993, Springer-Verlag, Berlin, Germany, © 2010, pp. 457-470.*

(Continued)

*Primary Examiner* — Robert Stevens
(74) *Attorney, Agent, or Firm* — Van Pelt, Yi & James LLP (57) ABSTRACT

Recommending keywords is disclosed, including: receiving a set of product information including a product title; extracting and parsing the product title into a set of parsed elements; finding a plurality of candidate keywords corresponding to at least a subset of the set of parsed elements based at least in part on stored mappings between parsed data and keywords; determining a plurality of composite correlation scores for corresponding ones of the plurality of candidate keywords; sorting at least a subset of the plurality of candidate keywords into a ranked list based on at least a subset of the plurality of composite correlation scores; and selecting a set of one or more keywords to recommend from the plurality of candidate keywords based at least in part on the ranked list.

19 Claims, 8 Drawing Sheets

(56) References Cited

U.S. PATENT DOCUMENTS

2012/0290553 A1* 11/2012 England et al. ............... 707/706
2013/0091142 A1 4/2013 Joseph et al.

OTHER PUBLICATIONS

Dumitru, Horatiu, et al., "On-demand Feature Recommendations Derived from Mining Public Product Descriptions", ICSE '11, Waikiki, Honolulu, HI, May 21-28, 2011, pp. 181-190.*

"Gini coefficient", Wikipedia, downloaded from: en.wikipedia.org/wiki/Gini_coefficient on Dec. 22, 2014, pp. 1-12.*

Huang, Shen, et al., "The Effect of Title Term Suggestion on E-commerce Sites", WIDM '08, Napa Valley, CA, Oct. 30, 2008, pp. 31-38.*

Irmak, Utku, et al., "Contextual Ranking of Keywords Using Click Data", IEEE International Conference on Data Engineering, IEEE Computer Society, © 2009, pp. 457-468.*

Jones, Rosie, et al., "Generating Query Substitutions", WWW 2006, Edinburgh, Scotland, May 23-26, 2009, pp. 387-396.*

Reddy, Naveen, et al., "Analyzing Plan Diagrams of Database Query Optimizers", Proc. of the 31st VLDB Conf., Trondheim, Norway, © 2005, pp. 1228-1239.*

Szpektor, Idan, et al., "Improving Recommendation for Long-tail Queries via Templates", WWW 2011, Hyderabad, India, Mar. 28-Apr. 1, 2011, pp. 47-56.*

Wang, Xuanhui, et al., "Mining Term Association Patterns from Search Logs for Effective Query Reformulation", CIKM '08, Napa Valley, CA, Oct. 30, 2008, pp. 479-488.*

Stamatina Thomaidou et al: "Multiword Keyword Recommendation System for Online Advertising", Advances in Social Networks Analysis and Mining (ASONAM), 2811 International Conference on, IEEE, Jul. 25, 2011, pp. 423-427, XP032037531, DOI: 10.1109/ASONAM.2011.70 ISBN: 978-1-61284-758-0, section III.

Dan Sisson: "Google SEO Secrets—How to Get a Top Ranking With Search Engine Optimization", 2006, pp. 1-105, XP055075784, ISBN: 978-0-97-285880-9 Retrieved from the Internet: URL:http://www.indiastudychannel.com/attachments/Resources/78724-30743-GGoogle SEO Secrets.pdf [retrieved on Aug. 20, 2013] chapters 3 and 5.

* cited by examiner

RECOMMENDING KEYWORDS

CROSS REFERENCE TO OTHER APPLICATIONS

This application claims priority to People's Republic of China Patent Application No. 201210125441.5 entitled TITLE KEYWORD RECOMMENDATION METHOD AND SYSTEM, filed Apr. 25, 2012 which is incorporated herein by reference for all purposes.

FIELD OF THE INVENTION

The present application involves information processing technology. In particular, it involves techniques for recommending keywords for product titles.

BACKGROUND OF THE INVENTION

Conventionally, on websites such as electronic commerce (e-commerce) websites, seller users submit product information associated with the products they are selling to be posted on the website. For example, a seller user may submit a set of product information for a product that he or she is selling over the website, where the set of product information may be displayed at a webpage associated with that product. The submitted set of product information may include text (e.g., title, attributes), video, images, and/or other media that describe the product.

Typically, a search engine associated with the website is able to search for the sets of product information relevant to a search query input by a search user by matching the search query to keywords included in the titles of the various sets of product information. In some e-commerce websites, if the keywords in a title of set of product information A matches one or more keywords in the search user's search query, then set of product information A will be determined as a search result. When a set of product information is determined as a search result, it will be shown to the search user and thus increase the chance that the product associated with set of product information A will be purchased. If the keywords included in the title of set of product information A rarely matches the keywords of a search query, then the chance that it will be displayed for and purchased by the search user decreases. As such, it is evident that the selection of appropriate keywords to be included in a title may increase the probability that a set of product information will be displayed for users. Similarly, the selection of less appropriate keywords to be included in the title may prevent search users from finding desired sets of product information in an efficient manner. The search user who has trouble finding desired sets of product information may need to repeatedly revise his or her search queries, which may be frustrating and also increase the workload for the search engine.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of recommending keywords are described herein. For a data object, at least a portion of the data object is parsed into one or more parsed elements. In various embodiments, the data object comprises a set of product information that is submitted by a seller user to describe a product that he or she is selling. In various embodiments, the portion of the set of product information that is parsed comprises the title of the product. The parsed elements are analyzed to select a set of keywords to be recommended to the seller user. The recommended keywords are selected based on their correlation to the set of product information and/or the parsed elements. In some embodiments, the recommended keywords comprise keywords used in historical search queries. The seller user may revise the previously submitted product title based on the recommended keywords to generate a revised product title that may have a greater chance of matching a search query in a subsequent search. The more likely that the product title matches a search query, the more likely that the set of product information will be displayed among search results and the more likely the product associated with the set of product information will be purchased.

Figure 1:
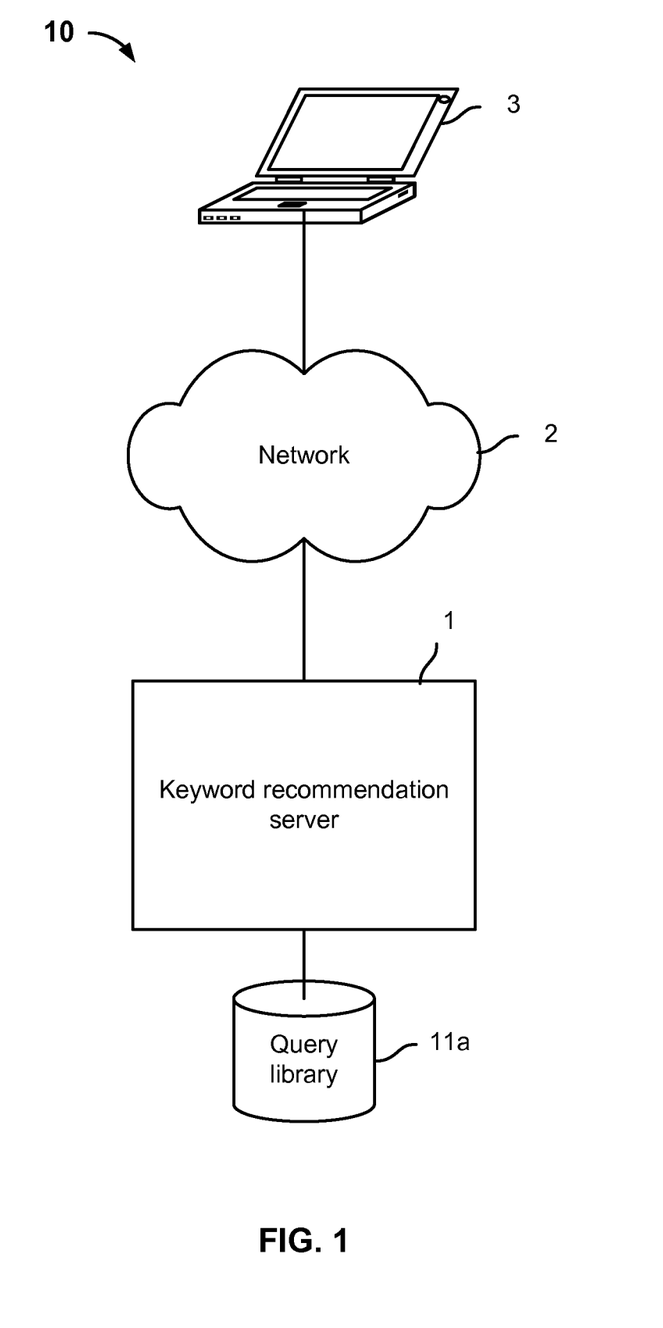
FIG. 1 is a diagram showing an embodiment for recommending keywords.

FIG. 1 is a diagram showing an embodiment for recommending keywords. In the example, system 10 includes client device 3, network 2, and keyword recommendation server 1. Network 2 includes high-speed data networks and/or telecommunications networks. In some embodiments, client device 2 is configured to communicate to keyword recommendation server 1 over network 2. In various embodiments, keyword recommendation server 1 is associated with an e-commerce website that stores sets of product information submitted by seller users. In some embodiments, a set of product information is presented to search users as part of search results if the product title of the set of product information matches a submitted search query.

While client device 3 is shown to be a laptop, other examples of client device 3 include a smart phone, a desktop computer, a tablet device, a mobile device and/or any other computing device. In various embodiments, a web browser application is installed at client device 3. For example, a seller user may submit a set of product information using the web browser to the e-commerce website associated with keyword recommendation server 1. The set of product information includes a product title, among other information such as, for example, descriptive information associated with the product, an industry to which the product belongs, an industry to which the seller user belongs, and an image. Keyword recommendation server 1 is configured to receive the set of product information and select a set of keywords to recommend to the seller user such that the seller user may revise the previously submitted product title and resubmit the revised product title for the set of product information.

In various embodiments, keyword recommendation server 1 is configured to select the set of keywords to recommend based on parsing the originally submitted product title and using query library 11a. In various embodiments, a series of characters or words (e.g., a product title) can be segmented into individual characters or words using parsing technology. As used herein, "parsed elements" refer to the individual characters or words that are parsed from a product title. Keyword recommendation server 1 is configured to look up keywords that correspond to the parsed elements based on stored mappings between parsed data and keywords of query library 11a. As used herein, "parsed data" refers to parsed elements included in mappings stored in a query library such as query library 11a. Keyword recommendation server 1 is configured to select at least a subset of these corresponding keywords to recommend to the seller user, which will be described in detail below.

Figure 2:
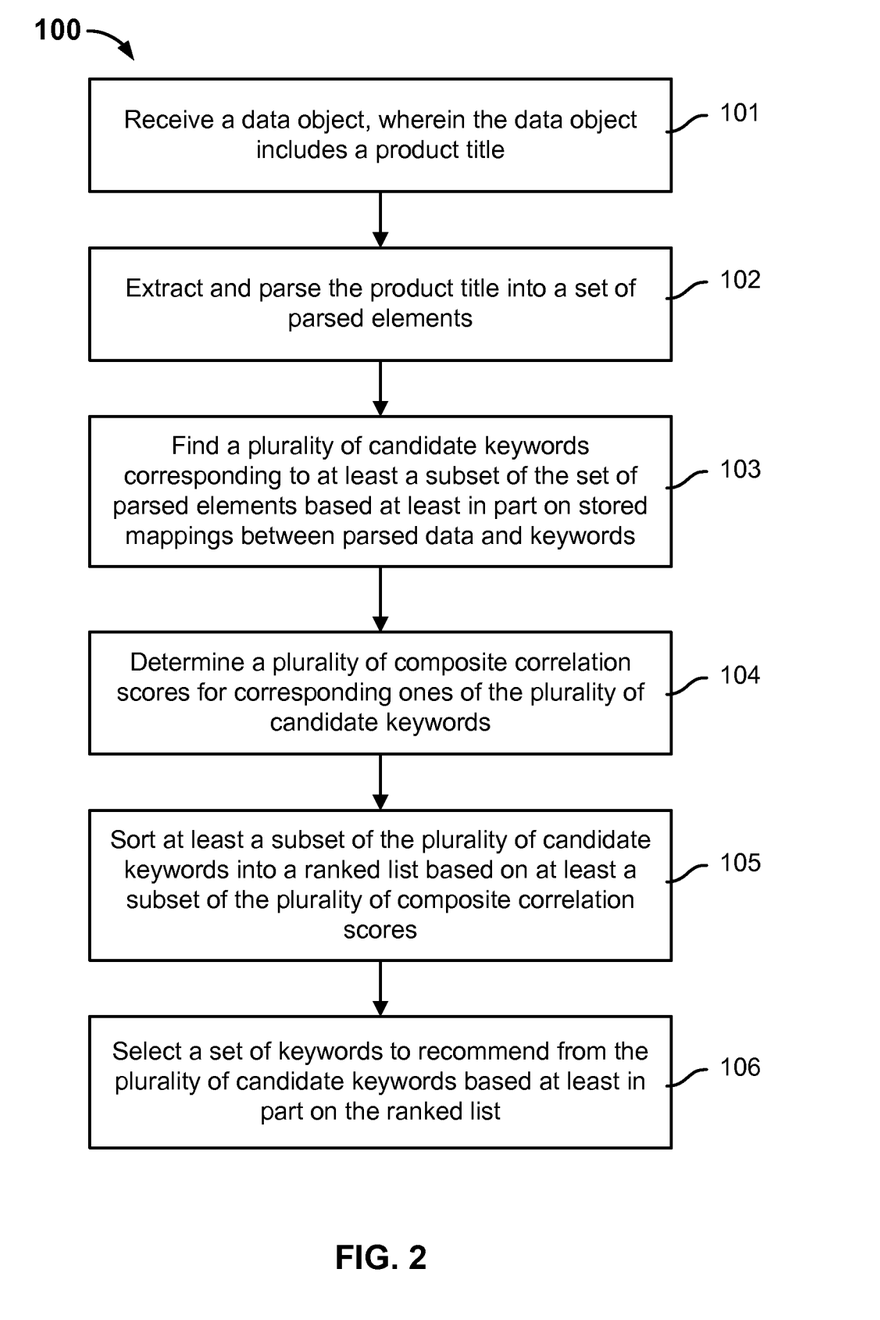
FIG. 2 is a flow diagram showing an embodiment of a process for recommending keywords.

FIG. 2 is a flow diagram showing an embodiment of a process for recommending keywords. In some embodiments, process 100 is performed at system 10 of FIG. 1.

Process 100 is used to receive a set of product information that is submitted by a seller user and in response, recommend one or more keywords to the seller user that the seller user may consider using to modify/revise at least a portion (e.g., the product title) of the previously submitted set of product information. The recommended one or more keywords, if included in the set of product information, may increase the chances that the set of product information will be matched to a subsequently submitted search query at the website.

At 101, a data object is received, wherein the data object includes a product title. In various embodiments, a data object comprises a set of product information submitted by a seller user from a client device such as client device 3 of system 10 of FIG. 1. The set of product information includes a product title, among other information, that describes the product that the seller user is attempting to sell at an e-commerce website.

At 102, the product title is extracted and parsed into a set of parsed elements. The product title is extracted and then parsed based on a selected parsing technique. For example, the product title may be parsed into words, phrases, and/or other sets of characters. For example, a keyword recommendation server such as keyword recommendation server 1 of system 10 of FIG. 1 extracts and parses the product title.

In one example of a parsing technique, the product title may be parsed into parsed elements that comprise the core nouns, modifying nouns, and modifiers of the title. The core nouns refer to words that are capable of expressing the core meaning of the title. The modifying nouns refer to nouns which serve to modify the core nouns. The modifiers refer to certain adjective or adverbs which serve to modify the core nouns and/or the modifying nouns. For example, modifiers comprise adjectives that describe color, size, or shape. For example, the product title of "Red MP3 player" is parsed into three parsed elements of "red," "MP3" and "player," where "red" is a modifier, "MP3" is a modifying noun, and "player" is a core noun.

Figure 3:
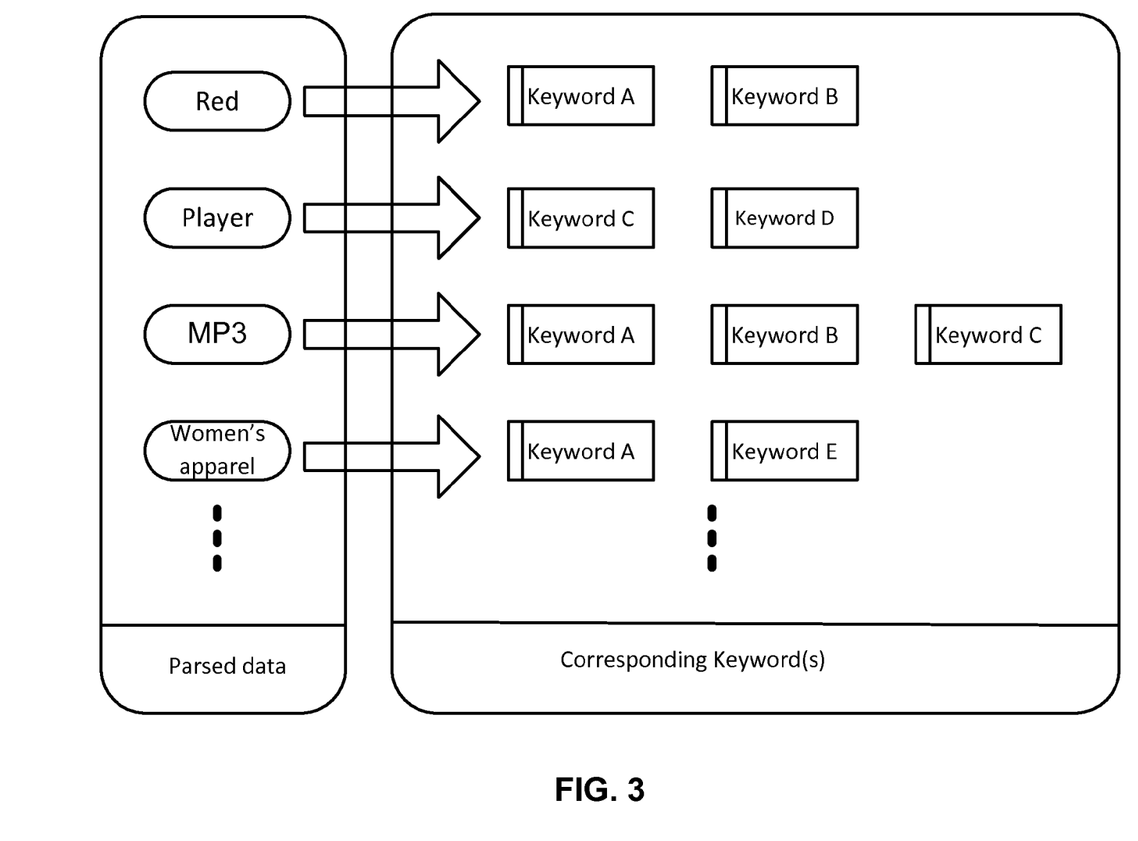
FIG. 3 shows one example of stored mappings of a query library.

At 103, a plurality of candidate keywords corresponding to at least a subset of the set of parsed elements is found based at least in part on stored mappings between parsed data and keywords. A keyword recommendation server such as keyword recommendation server 1 may search a query library such as query library 11a using the set of parsed elements obtained from 102. The query library stores predetermined mappings of parsed data to corresponding keywords. In some embodiments, the parsed data of the query library comprises parsed elements from previously submitted sets of product information. In some embodiments, the keywords corresponding to the parsed data of the query library comprises search keywords used in historical searches performed at the website. In some embodiments, the mapping of parsed data to corresponding keywords is organized as an inverted index. The keyword recommendation server may search the query library based on all of the parsed elements of the set or only a subset of the set of parsed elements (e.g., search based on only the core nouns of the title). For example, if a parsed element matches a piece of parsed data in the query library, then the keyword(s) corresponding to that piece of parsed data are retrieved. The corresponding keywords may be retrieved from the query library based on such text retrieval algorithms as Sphinx, Lucene, or Coreseek. Additionally, a full text retrieval method obtained by combining Sphinx with PostgreSQL may be used to retrieve the corresponding keywords from the query library. FIG. 3 shows one example of stored mappings of a query library. In FIG. 3, the index includes the four pieces of parsed data ("red," "player," "MP3" and "women's apparel") and their respective corresponding keywords. In FIG. 3, the piece parsed data "red" corresponds to keyword A and keyword B; the piece of parsed data "player" corresponds to keyword C and keyword D; the piece of parsed data "MP3" corresponds to keyword A, keyword B, and keyword C; and the parsed data "women's apparel" corresponds to keyword A and keyword E. For example, referring to the query library example of FIG. 3, if only the parsed element comprising the core noun of the product title "player" is to be used for searching, then the keyword recommendation server can find the keywords corresponding to the matching piece of parsed data of "player" from the stored mapping, i.e., keyword C and keyword D. An example technique of generating the mappings of parsed data to corresponding keywords is described further below.

In some embodiments, after finding the set of keywords that corresponds to the parsed elements, a text-based correlation value between each parsed element and each of its corresponding keyword is retrieved. In some embodiments, the text-based correlation value between each parsed element and each of its corresponding keyword is previously stored and thus retrieved. In some embodiments, the text-based correlation value between each parsed element and each of its corresponding keyword is generated dynamically using any known technique. Any text-based correlation technique may be used to determine the correlation value between a parsed element and a corresponding keyword. The candidate keywords may be sorted according to their respective text-based correlation values to the parsed elements and only a preset number of candidate keywords that are ranked at the top of the sorted list may be selected to serve as the candidate keywords relevant to the title. The number of keywords to select from the sorted list may be set based on the system's data processing capabilities. For example, only the first 50 of the sorted keywords are selected to serve as the candidate keywords in some embodiments.

The selected keywords are referred to as "candidate" keywords because not every keyword is necessarily going to be sent to the client device and recommended to the seller user. As will be described below, at least a subset of the set of candidate keywords is to be selected for the seller user.

Returning to FIG. 2, at 104, a plurality of composite correlation scores is determined for corresponding ones of the plurality of candidate keywords. In some embodiments, a composite correlation score is determined for each of the candidate keywords based on at least one or more index values. In various embodiments, the composite correlation score refers to an indicator reflecting the degree of correlation between the candidate keyword and a parsed element (and/or the set of product information). In some embodiments, the higher the composite correlation score is for a candidate keyword, the more high quality the keyword is (e.g., the keyword is more likely to match to subsequent search queries), and the more likely that it will be recommended to the seller user.

In some embodiments, the composite correlation score associated with a corresponding candidate keyword is determined based on a combination of one or more of the following: the supply and demand index value corresponding to the candidate keyword, the Gini coefficient (or index value) corresponding to the candidate keyword, and the industry index value corresponding to the candidate keyword. In some embodiments, the supply and demand index value is used to reflect the supply and demand relationship relevant to the candidate keyword; the Gini coefficient value is used to reflect the probability that the data objects (e.g., sets of product information) that match the candidate keyword will be displayed among search results; and the industry index value is used to reflect the correlation between the candidate keyword and the industries to which the data objects (e.g., sets of product information) that are relevant to the candidate keyword belong. In some embodiments, the Gini index value is considered so that the recommended keywords to be used in the product title are able to increase the likelihood that data objects (e.g., set of product information) that are associated with the recommended keywords will be included in presented search results. In some embodiments, the industry index value is considered so that the recommended keywords can help increase the likelihood that the data objects associated with the recommended keywords will be included in presented search results associated with corresponding industries. In some embodiments, the supply and demand index value is considered so that the current data objects associated with the candidate keyword satisfy current levels of supply and demand and the associated data objects (e.g., sets of product information) will be included in presented search results.

In some embodiments, the text-based correlation value retrieved for the candidate keyword, as mentioned above with 103 is also combined with one or more of the supply and demand index value corresponding to the candidate keyword, the Gini coefficient (or index value) corresponding to the candidate keyword, and the industry index value corresponding to the candidate keyword to determine the composite correlation for the candidate keyword. In some embodiments, stored metadata and/or historical data (e.g., historical click-through data, historical search data) associated with a candidate keyword is used in determining one or more of the supply and demand index value corresponding to the candidate keyword, the Gini coefficient (or index value) corresponding to the candidate keyword, and the industry index value corresponding to the candidate keyword to determine the composite correlation for the candidate keyword.

The following is an example technique of determining the supply and demand index value for a candidate keyword:

Supply and demand index value associated with a candidate keyword=(the search volume relevant to the candidate keyword)/(number of data objects supplied)    (1)

Formula (1) will be further explained below. The supply and demand index value of a candidate keyword is determined based on historical search data associated with the candidate keyword. In the context of an e-commerce website, the website may feature a search engine that returns relevant sets of product information (corresponding to respective products sold at the website) in response to a user submitted search keyword. The search keyword in this case is the candidate keyword. In response to the submitted candidate keyword, the search engine will perform a search by matching the candidate keyword to the titles and/or other information associated with stored sets of product information. In some embodiments, the search volume relevant to the candidate keyword (i.e., the numerator of formula (1)) above, refers to the total number of stored data objects (e.g., stored sets of product information) that were found to match the candidate keyword.

Because the total number of stored sets of product information may be enormous, it is more practical to display only a subset of the search volume relevant to the candidate keyword for the search user. Therefore, the subset of the most relevant (e.g., highly correlated) of the found sets of product information is selected to be displayed for the search user. For example, assume that there are 1,000 stored sets of product information that were historically found to be relevant to the candidate keyword. Assume that if the 1,000 sets of product information are ranked based on their respective correlations to the candidate keyword, only 200 sets of the highest ranked (e.g., most highly correlated sets of product information) are selected to be displayed for the search user. Assume that the correlation between each set of product information and the candidate keyword is assigned one of 12 grades, from 1 through 12. The correlation grade between the $i^{th}$ set of product information and the candidate keyword is represented by the variable mlri. If there are n sets of product information that are found to be relevant to the candidate keyword and where n<200, then each of mlr(1), mlr(2), . . . , mlr(n−1) is greater than zero and each of mlr(n+1), mlr(n+2), . . . , mlr200 is 0 (because the nth and (n+1)th (and so on) sets of product information are determined to be not relevant to the candidate keyword). The total number of data objects supplied (i.e., the denominator of formula (1)) can be computed using the formula: sum(mlr1+ . . . +mlr200)/12+(the search volume relevant to the candidate keyword)*(1+mlr200)/2/12.

The following is an example technique of determining the Gini index value for a candidate keyword:

The Gini index value of a candidate keyword can be expressed using the formula:

$$1 - \frac{1}{2} \times (2^{\sum_{i=1}^{n-1} w_i + 1}) \qquad (2)$$

Where n represents the number of groups into which the historical data objects found to match the candidate keyword can be sorted, as will be described below.

The Gini index value of the candidate keyword is determined based on the historical search data associated with the candidate keyword. For example, the historical data objects (e.g., sets of product information) that have been found to match the candidate keyword may be sorted into n groups based on the data object's respective display counts (e.g., respective number of times that the data objects have been displayed among search results) and $w_i$ expresses the display ratio of the $i^{th}$ group. For example, the display ratio refers to the ratio of the display count of each group (e.g., the display count of each group is the sum of the display count of each of the data objects in that group) to the total display count of n groups (e.g., the total display count of n groups is the sum of the display count for each data object in any of the n groups).

The following is an example technique of determining the industry index value for a candidate keyword:

The industry index value of a candidate keyword is determined using historical search data and other metadata stored for the candidate keyword. For example, the metadata includes data identifying the industry of the seller user(s) associated with the data objects (e.g., sets of product information) that are relevant to the candidate keyword (the industries of the seller users, for example, may be determined from the stored attributes associated with the seller users), the one or more industries to which the data objects belong (the industries of the data objects, for example, may be determined from the stored attributes associated with the relevant sets of product information), the one or more industries to which the candidate keyword belongs (the industries of the keyword, for example, may be determined from the industries associated with the relevant sets of product information), and an industry similarity coefficient (which may be determined from industry analysis) to determine the correlations between the keyword industry and the industries to which the data objects belong. The one or more industries to which the data objects belong refer to the one or more industries to which they belonged at the time that the data objects were published (which, for example, can be the time of posting on an e-commerce platform).

The industry index value of a candidate keyword can be expressed using formula (3) below:

$$\text{Industry index value} = M1 * W1 + M2 * W2 \qquad (3)$$

Where M1 represents the similarity coefficient between the one or more industries to which the keyword belongs and the one or more industries to which the relevant data object belongs, and M2 represents the similarity coefficient between the one or more industries to which the keyword belongs and the one or more primary industries of the seller-users (e.g., associated with the relevant data objects), and W1 and W2 are weights. For example, the value of W1 can be set at 0.75 and the value of W2 can be set at 0.25.

When formula (3) is used to compute the industry index value for the candidate keyword, the similarity coefficient between the one or more industries to which the candidate keyword belongs and the one or more industries to which the data objects belong can be used for the value of M1, and the similarity coefficient between the one or more industries to which the candidate keyword belongs and the one or more primary industries of the seller-users can be used for the value of M2.

After the four types of determinations (i.e., the text-based correlation value between the candidate keyword and the corresponding parsed element, the supply and demand index value, the Gini index value, and the industry index value) have been obtained for each candidate keyword, in some embodiments, weights W11, W12, W13, and W14 may be respectively assigned to each value. For example, the respective values of these four weights may be configured to be W11=0.4, W12=0.2, W13=0.1, and W14=0.3, based on their respective significances that are configured by a system administrator or an expert user.

The four values described above can be multiplied by their respective weights and then combined to obtain a composite correlation score. In some embodiments, the weighted values may be combined by being summed together to obtain the composite correlation score. In some embodiments, the weighted values may be combined by being multiplied together to obtain the composite correlation score. In some embodiments, the composite correlation score may be normalized. For example, the statistical technique of linear regression may be used to compute a normalized composite correlation as follows: normalized composite correlation=1/(1+$e^{-t}$), wherein, t=(the composite correlation)+(a correction coefficient), and e is the base of the natural logarithm. The correction coefficient may be configured based on data processing requirements.

In some other embodiments, other statistical techniques may also be used in obtaining the composite correlation score of each candidate keyword. For example, fewer than all three index values (the industry index value, the supply and demand index value, and the Gini index value) can be combined with the retrieved text-based correlation value between the candidate keyword and the corresponding parsed element to determine the composite correlation score. In practice, more or fewer index values or other values may be computed for each candidate keyword and used to determine the composite correlation score for that candidate keyword.

In some embodiments, instead of dynamically determining the supply and demand index value, Gini index value, and/or the industry index value of each keyword after receiving a set of product information for which keywords are to be recommended, the index values may be determined and stored (e.g., in an index library) before receiving the set of product information. In some embodiments, the text-based correlation value between a parsed element and a corresponding keyword can also be determined and stored (e.g., in the query library) before receiving the set of product information. As such, the stored index values and the stored text-based correlation value corresponding to each candidate keyword can simply be retrieved from storage during process 100.

At 105, at least a subset of the plurality of candidate keywords is sorted into a ranked list based on at least a subset of the plurality of composite correlation scores. The candidate keywords are sorted into a ranked list based on their respective composite correlation scores. Candidate keywords associated with higher composite correlation scores are considered to be higher quality keywords that if included in a product title, could potentially help the set of the product information associated with the product title become included and displayed in more search results for users.

At 106, a set of keywords to recommend is selected from the plurality of candidate keywords based at least in part on the ranked list. Once the candidate keywords are ranked, then first (i.e., top ranking) N candidate keywords are determined to be the set of keywords to be sent to the client device and recommended to the seller user as good keywords to be potentially included in a revised product title, where N represents a positive integer. The keyword recommendation server sends the set of recommended keywords to the client device, which presents the set of recommended keywords to the seller user. The seller user then submits a revised product title for the set of product information, where the revised product title includes one or more of the recommended keywords. By revising the product title to include one or more of the recommended keywords, the updated set of product information may more likely match a search user's query and therefore be displayed for the search user. Therefore, the recommended keywords may help increase the chances that a set of product information is included in presented search results and also reduce the number of queries submitted by search users because the set of product information is now associated with the appropriate keywords in the product title and will more likely match a search user's intention in performing a search without causing the search user to repeatedly submit different searches.

Figure 4:
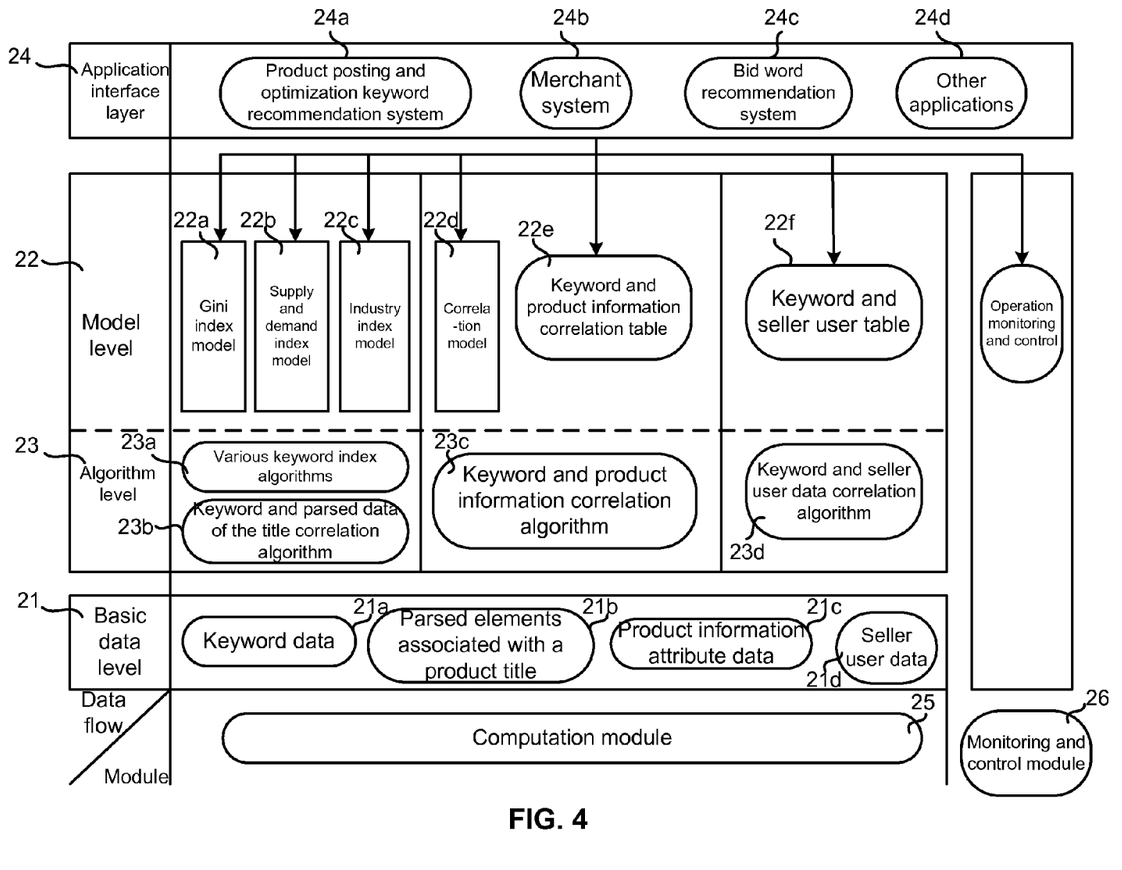
FIG. 4 is a diagram showing an example of an e-commerce platform configuration.

FIG. 4 is a diagram showing an example of an e-commerce platform configuration. The example includes basic data level 21, algorithm and model levels (comprising model level 22 and an algorithm level 23), and application interface level 24.

Basic data level 21 is configured to provide basic data to the algorithm and model levels and application interface level 24. In the example, basic data includes keyword data 21a, parsed elements associated with a product title 21b, product information attribute data 21c, and seller user data 21d. For example, seller-user data 21d comprises relevant information associated with the registered users of this e-commerce platform.

Algorithm level 23 includes various keyword index algorithms 23a, correlation algorithm 23b for determining the correlation between the keyword and the parsed elements of the product title, relational algorithm for 23c for the relationship between keywords and product information, and relational algorithm 23d for the relationship between the keyword and seller user data. Relational algorithm 23c for the relationship between keywords and product information may comprise parsing algorithms, etc.

Model level 22 includes the output models corresponding to the various algorithms of algorithm level 23. In the example, model level 22 includes Gini index model 22a, supply and demand index model 22b, industry index model 22c, and correlation model 22d. Model level 22 also includes keyword and product information correlation table 22e, and keyword and seller user table 22f.

Application interface level 24 includes various specific applications. In the example, application interface level 24 includes product posting and optimization keyword recommendation system 24a, merchant system 24b, bid word recommendation system 24c, and other applications 24d.

Computation module 25 is configured to retrieve the candidate keywords from the query library (not shown), to retrieve the title keywords relevant to the seller user, to retrieve the various index values, etc.

The example also includes monitoring and control module 26. Monitoring and control module 26 is configured to perform operation monitoring and control whether or not the seller user submits a revised product title that includes any of the keywords that were recommended to the seller user.

Figure 5:
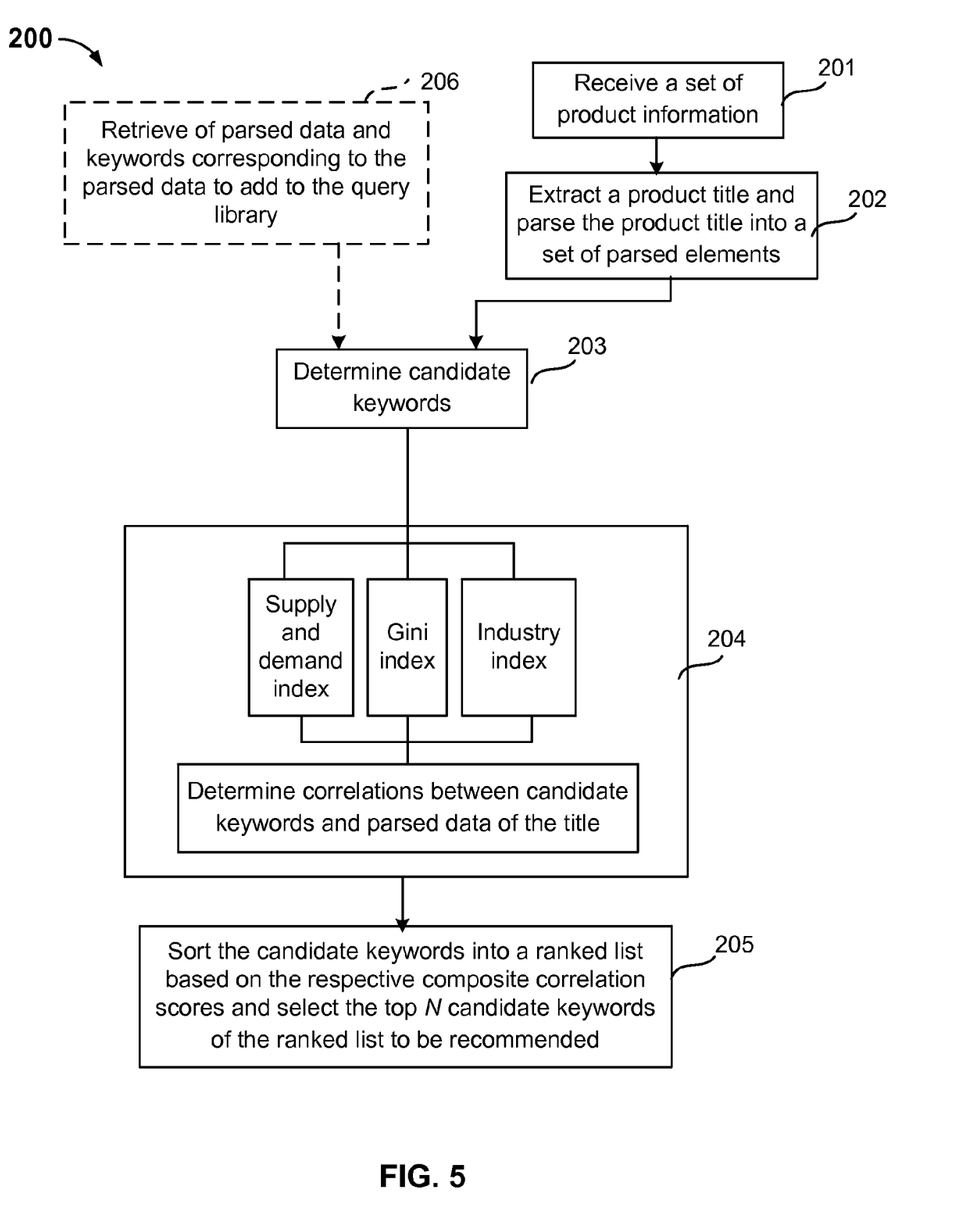
FIG. 5 is a flow diagram showing an embodiment of a process for recommending keywords.

FIG. 5 is a flow diagram showing an embodiment of a process for recommending keywords. In some embodiments, process 200 is implemented at system 10 of FIG. 1.

At 201, a set of product information is received.

At 202, a product title is extracted from the set of product information and parsed into a set of parsed elements. In some embodiments, a correlation value between each parsed element data and the set of product information is determined. Then, the first M (M is a positive integer) parsed elements that are associated with the greatest correlation values with the set of product information are selected to be used for further processing of the parsed elements, while the unselected parsed elements are not used for further processing.

At 203, candidate keywords corresponding to the set of parsed element are determined using a query library.

At 204, composite correlation scores corresponding to the candidate keywords are determined. In some embodiments, text-based correlation values between a parsed element and each of its corresponding candidate keywords are determined. In some embodiments, one or more of the supply and demand index value, Gini index value, and industry index value are determined for each candidate keyword. In some embodiments, the composite correlation score for a candidate keyword is determined based on the text-based correlation value and any one or more of the supply and demand index value, Gini index value, and industry index value.

At 205, the candidate keywords are sorted into a ranked list based on their respective composite correlation scores and the top N candidate keywords of the ranked list are selected to be recommended.

In some embodiments, step 206 of process 200 may be performed at least partially in parallel to any of the other steps of process 200. In some embodiments, step 206 of process 200 may be performed offline, such as before or after process 200 is implemented and/or at regular or irregular intervals. At 206, parsed data and keywords corresponding to the parsed data to be added to the query library are retrieved.

In some embodiments, if candidate keywords cannot be found in the query library, then a supplemental step can be provided where keywords relevant to the industry to which the set of product information belongs are found and used as candidate keywords.

In some embodiments, each of the steps of process 200 may be performed on one or more servers. For example, steps 201-205 may be executed by a first server and step 206 may be executed by a second server. Data may be exchanged between these two servers. In another example, the same processing can be handled by the same server to increase data processing efficiency. For instance, steps 202 and 206 both involve the processing of parsed element and so these two steps may be executed by the same server. The other steps can be realized by another server.

Figure 6:
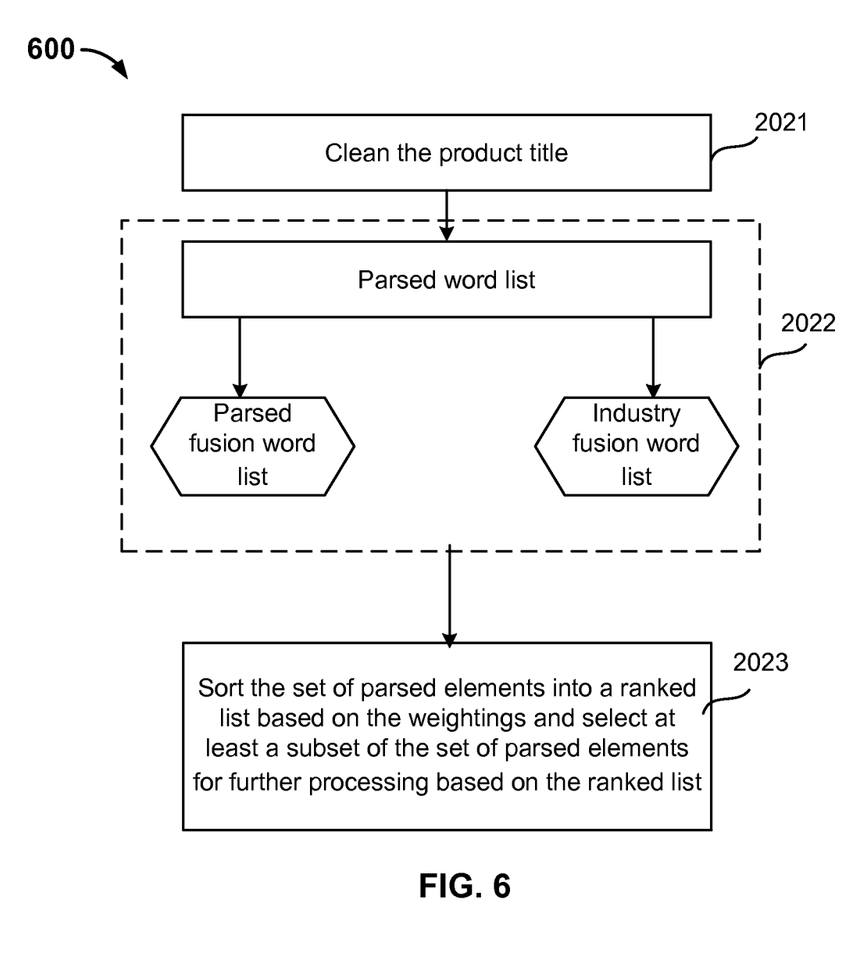
FIG. 6 is a flow diagram showing an example of parsing a product title.

FIG. 6 is a flow diagram showing an example of parsing a product title. In some embodiments, 202 of process 200 of FIG. 5 is implemented using process 600 of the example.

At 2021, the product title is cleaned. In some embodiments, the product title is extracted from a set of product information submitted by a seller user. In some embodiments, cleaning the product title includes removing certain words (e.g., stop words such as "a", "the", "is", "which", "on") and/or designated punctuation from the product title.

At 2022, the product title is parsed into a set of parsed elements corresponding to the set of parsed elements are determined. In some embodiments, the product title may be parsed by comparing the product title to words included in a parsing word list and any portion of the product title that matches a word in the parsing word list is parsed out as a parsed element. In some embodiments, words of the parsing word list may include core nouns, modifying nouns, and modifiers, which were described above.

Optionally, weightings for the various parsed elements may be obtained using an industry fusion word list. The industry fusion word list comprises a list of industry-related words obtained by analyzing industry data and a list of core words that are highly correlated to the industry. After the set of parsed elements are determined in 2022, the similarity between the one or more industries of the parsed elements and the industry of the set of product information (or the industry of the seller user) may be obtained using the industry fusion word list, which can then be used to compute the weightings for the parsed elements.

Optionally, after the set of parsed elements are determined, a parsed fusion word list may be used to perform fusion processing of the parsed elements. Certain parsed elements may have unclear meanings, so that they are unable to accurately represent the product information. For example, the parsed element "equipment" is unable to clearly state which industry that set of product information belongs to. For example, just "equipment" alone is unable to confirm whether the set of product information is electronic equipment or mechanical equipment or other equipment. In order to ensure that the meaning of the parsed elements is clear, some of the parsed elements may be combined (or fused) with other words (that may or may not also be parsed elements). For example, the parsed element "equipment" can be fused with other words based on the parsing fusion word list. A reference table of certain parsed combinations is included in the parsing fusion word list. When a parsed element can be found in the parsing fusion word list, a certain strategy may be configured to analyze whether or not it is desirable to combine the parsed element with certain modifiers. For example, the modifiers with which a parsed element may be fused may be associated with the industry associated with the seller user.

At 2023, the set of parsed elements are sorted into a ranked list based on the weightings and at least a subset of the set of parsed elements is selected for further processing based on the ranked list. For example, the parsed elements can be sorted from largest to smallest weightings and the first M (M is a positive integer) ranked parsed elements may be selected to use for further processing of the parsed elements.

Figure 7:
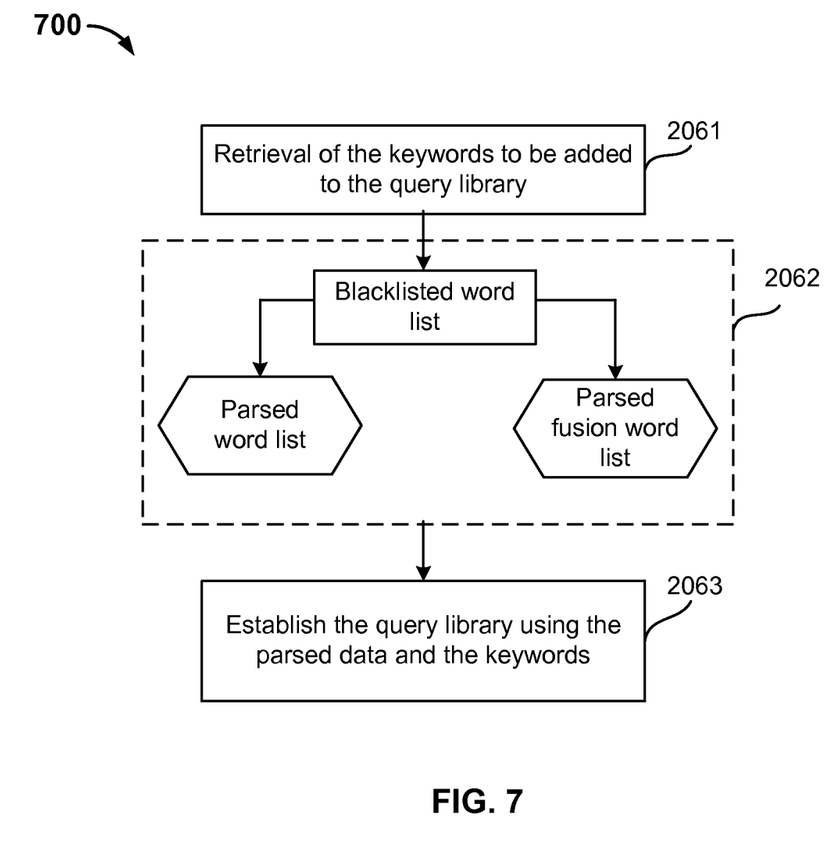
FIG. 7 is a flow diagram showing an example of retrieving parsed data and keywords to add to the query library.

FIG. 7 is a flow diagram showing an example of retrieving parsed data and keywords to add to the query library. In some embodiments, 206 of process 200 of FIG. 5 is implemented using process 700 of the example.

At 2061, keywords to be added to the query library are retrieved. For example, the keywords to be added to the query library may be retrieved from stored historical search logs. The retrieved keywords may be selected based on the number of searches for the keyword that is included in the search log and the number of search results that were returned for the searched keyword. For example, a certain number of search keywords associated with the highest search number rankings (the first 40,000 associated with the highest search number rankings) can be selected to be added to the query library.

In some embodiments, cleaning, filtering, modification, and/or merging may be performed on the selected keywords before they are added to the query library.

At 2062, parsed data to be added to the query library is retrieved. In some embodiments, the parsed data is retrieved from a predetermined parsed word list and/or a predetermined parsed fusion word list. In some embodiments, the parsed word list and/or the predetermined parsed fusion word list were generated from (portions of) actual sets of product information that were previously submitted by various seller users.

In some embodiments, a blacklisted word list comprises a list of words to exclude from the query library. Parsed data that matches the blacklisted word list are eliminated and excluded from the query library.

At 2063, the query library is established using the parsed data and the keywords. Corresponding relationships are established between the parsed data and the keywords to create mappings and the mappings are added to a new or existing query library. In some embodiments, corresponding relationships between parsed data and keywords are determined based on a thesaurus. For example, for each piece of parsed data to be added to the query library, a thesaurus is used to determine synonyms to the piece of parsed data and if any of the keywords to be added to the query library comprises a synonym, then the keyword is determined to correspond to that piece of parsed data in the query library. Besides using a thesaurus, any other technique for determining corresponding relationships between pieces of parsed data and keywords may be used as well. In some embodiments, an inverted index is also established for the query library.

In some embodiments, the supply and demand index values, Gini index values, and industry index values corresponding to the keywords that have been determined may be added to an index library.

Figure 8:
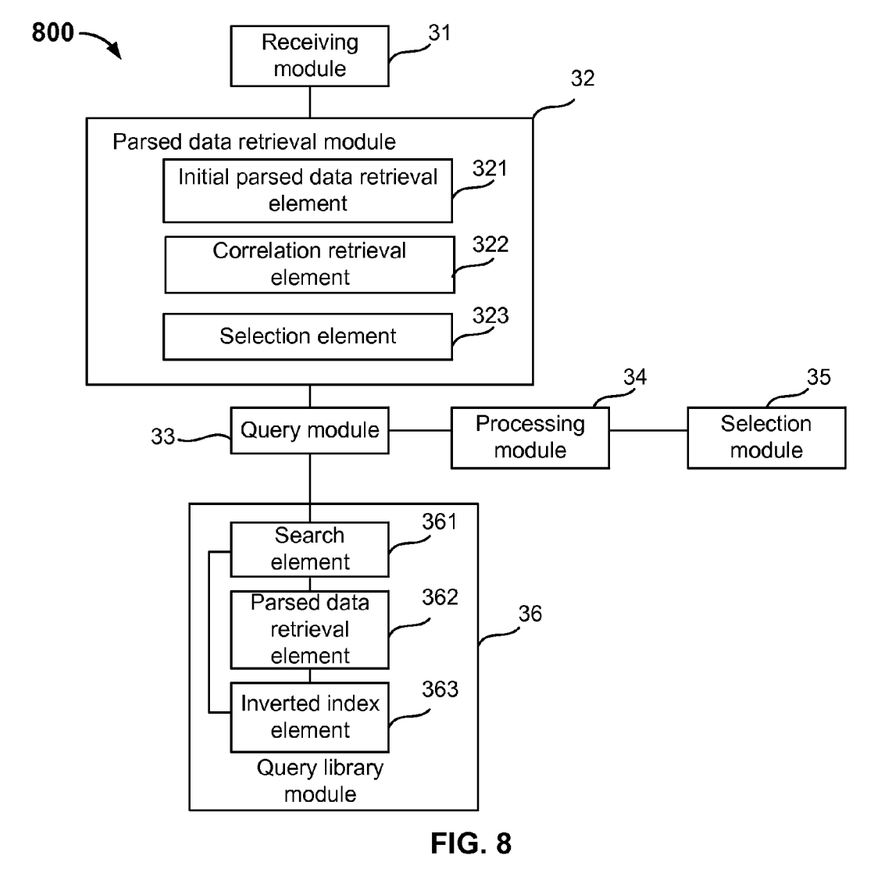
FIG. 8 is a diagram showing an embodiment of a system for recommending keywords.

FIG. 8 is a diagram showing an embodiment of a system for recommending keywords. In the example, system 800 includes receiving module 31, parsed data retrieval module 32, query module 33, processing module 34, and selection module 35.

The modules and elements can be implemented as software components executing on one or more processors, as hardware such as programmable logic devices and/or Application Specific Integrated Circuits designed to perform certain functions, or a combination thereof. In some embodiments, the modules and elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and elements may be implemented on a single device or distributed across multiple devices.

Receiving module 31 is configured to receive data objects (e.g., sets of product information). Parsed data retrieval module 32 is connected to receiving module 31 and is configured to retrieve the parsed elements of the product title extracted from the data object. Query module 33 is connected to parsed data retrieval module 32 and is configured to search the query library for keywords corresponding to the parsed elements of the product title to serve as the candidate keywords relevant to the product title. Processing module 34 is connected to query module 33 and is configured to combine the text-based correlation values between the candidate keywords and the parsed elements of the title with at least one of the following: the supply and demand index values used to reflect the supply and demand relationship relevant to the candidate keywords, the Gini index values used to reflect the degree to which the data objects that match the candidate keywords are displayed within search results, and the industry index values used to reflect the correlations between the industries to which the candidate keywords and the data objects belong, in order to obtain a composite correlation score for each candidate keyword. Selection module 35 is connected to processing module 34 and is configured to select the first N candidate keywords from the ranked list to recommend to the seller user associated with submitting the data object, where N comprises a positive integer.

In some embodiments, processing module 34 is configured to obtain a composite weighted correlation score by multiplying the value and/or index values corresponding to the candidate keywords by their respective weightings and then combining the weighted values.

In some embodiments, parsed data retrieval module 32 is configured to include initial parsed data retrieval element 321, correlation retrieval element 322, and selection element 323. Initial parsed data retrieval element 321 is configured to retrieve parsed the product title into a set of parsed elements. Correlation retrieval element 322 is connected to initial parsed data retrieval element 321 and is configured to retrieve the correlations between each initial parsed data and the data object (e.g., set of product information). Selection element 323 is connected to correlation retrieval element 322 and is configured to sort the set of parsed elements into a ranked list based on the determined correlations and to select the first M ranked parsed elements of the ranked list to use for further processing of the parsed elements, where M is a positive integer.

In some embodiments, system 800 further includes query library module 36. Query library module 36 is connected to query module 33 and is configured to retrieve the keywords corresponding to the set of parsed elements from the query library. In some embodiments, query library module 36 includes search element 361, parsed data retrieval element 362, and inverted index element 363. Search element 361 is configured to retrieve from the historical search log the keywords to be added to the query library. Parsed data retrieval element 362 is connected to search element 361 and is configured to retrieve the parsed data to be added to the query library. Inverted index element 363 is connected to search element 361 and parsed data retrieval element 362 and is configured to establish an inverted index from the parsed data and its corresponding keywords to store in the query library.

In some embodiments, system 800 may further comprise modules used to retrieve the supply and demand index values, the Gini index values, and the industry index values of the keywords to be added to the query library.

The method and corresponding steps offered in the present application can be realized using one or multiple pieces of processing equipment possessing data processing capabilities, such as one or multiple servers running computer-executable commands. The various commands used to execute each step of the method offered in the present application can be saved in the server's storage media.

Each of the individual modules in the system of the present application can be realized using one or more servers running computer-executable commands. Each module can be an equipment component having the corresponding functions when this server runs computer-executable commands.

Although the present application has already been described with reference to typical embodiments, it should be understood that the terms used are explanatory and exemplary, and are not restrictive terms. Because the present application can be implemented in a variety of forms without departing from the spirit or substance of the invention, it should therefore be understood that the aforesaid embodiments are not limited by any of the aforesaid details, and should be broadly interpreted within the spirit and scope of the attached claims, therefore all changes and modifications falling within the scope of the claims or their equivalents should be covered by the attached claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for recommending keywords, comprising:
one or more processors configured to:
  receive a set of product information including a product title;
  extract and parse the product title into a set of parsed elements;
  find a plurality of candidate keywords corresponding to at least a subset of the set of parsed elements based at least in part on stored predetermined mappings between parsed data and keywords;
  determine a plurality of composite correlation scores for corresponding ones of the plurality of candidate keywords, wherein to determine the plurality of composite correlation scores includes to determine a first composite correlation score associated with a first candidate keyword of the plurality of candidate keywords, wherein to determine the first composite correlation score associated with the first candidate keyword includes to determine an industry index value associated with the first candidate keyword, including to:
    determine a first similarity value between one or more industries associated with the first candidate keyword and one or more industries associated with sets of product information that are relevant to the first candidate keyword;
    determine a second similarity value between the one or more industries associated with the first candidate keyword and one or more industries of one or more seller users associated with the sets of product information that are relevant to the first candidate keyword; and
    determine the industry index value associated with the first candidate keyword based at least in part on a combination of the first similarity value and the second similarity value; and
  sort at least a subset of the plurality of candidate keywords into a ranked list based on at least a subset of the plurality of composite correlation scores; and
  select a set of one or more keywords to recommend from the plurality of candidate keywords based at least in part on the ranked list; and
one or more memories coupled to the one or more processors and configured to provide the one or more processors with instructions.

2. The system of claim 1, wherein the one or more processors are configured to determine the at least subset of the set of parsed elements, including to:
  determine a correlation value between each of the set of parsed elements and the set of product information; and
  determine the at least subset of the set of parsed elements to include M parsed elements of the set of parsed elements associated with the highest respective correlation values, wherein M comprises a positive integer.

3. The system of claim 1, wherein at least a subset of the keywords included in the predetermined mappings between parsed data and keywords is determined from historical search logs.

4. The system of claim 1, wherein to determine the plurality of composite correlation scores includes to determine the first composite correlation score associated with the first candidate keyword based at least in part on a text-based correlation value between the first candidate keyword and a corresponding parsed element from the set of parsed elements.

5. The system of claim 1, wherein to determine the plurality of composite correlation scores includes to determine the first composite correlation score associated with the first candidate keyword based at least in part on a Gini index value associated with the first candidate keyword, wherein the Gini index value is used to reflect a probability that sets of product information that match the first candidate keyword are displayed among search results.

6. The system of claim 1, wherein to determine the plurality of composite correlation scores includes to determine the first composite correlation score associated with the first candidate keyword based at least in part on a supply and demand index value associated with the first candidate keyword, wherein the supply and demand index value is used to reflect a supply and demand relationship relevant to the first candidate keyword.

7. The system of claim 1, wherein to determine the plurality of composite correlation scores includes to determine the first composite correlation score associated with the first candidate keyword based at least on a combination of a text-based correlation value between the first candidate keyword and a corresponding parsed element from the set of parsed elements, a Gini index value associated with the first candidate keyword, a supply and demand index value associated with the first candidate keyword, and the industry index value associated with the first candidate keyword.

8. The system of claim 1, wherein the one or more processors are further configured to clean the product title prior to parsing the product title into the set of parsed elements.

9. The system of claim 1, wherein the one or more processors are further configured to receive an update to the set of product information, the update being based at least in part on the set of one or more keywords.

10. The system of claim 1, wherein to find the plurality of candidate keywords corresponding to the at least subset of the set of parsed elements comprises to:
identify a matching piece of parsed data of the stored predetermined mappings;
determine one or more keywords that correspond to the matching piece of parsed data in the stored predetermined mappings; and
include the one or more keywords that correspond to the matching piece of parsed data in the plurality of candidate keywords.

11. A method for recommending keywords, comprising:
receiving a set of product information including a product title;
extracting and parsing the product title into a set of parsed elements;
finding a plurality of candidate keywords corresponding to at least a subset of the set of parsed elements based at least in part on stored predetermined mappings between parsed data and keywords;
determining a plurality of composite correlation scores for corresponding ones of the plurality of candidate keywords, wherein determining the plurality of composite correlation scores includes determining a first composite correlation score associated with a first candidate keyword of the plurality of candidate keywords, wherein determining the first composite correlation score associated with the first candidate keyword includes determining an industry index value associated with the first candidate keyword, including:
determining a first similarity value between one or more industries associated with the first candidate keyword and one or more industries associated with sets of product information that are relevant to the first candidate keyword;
determining a second similarity value between the one or more industries associated with the first candidate keyword and one or more industries of one or more seller users associated with the sets of product information that are relevant to the first candidate keyword; and
determining the industry index value associated with the first candidate keyword based at least in part on a combination of the first similarity value and the second similarity value; and
sorting at least a subset of the plurality of candidate keywords into a ranked list based on at least a subset of the plurality of composite correlation scores; and
selecting a set of one or more keywords to recommend from the plurality of candidate keywords based at least in part on the ranked list.

12. The method of claim 11, wherein the at least subset of the set of parsed elements is determined based on:
determining a correlation value between each of the set of parsed elements and the set of product information; and
determining the at least subset of the set of parsed elements to include M parsed elements of the set of parsed elements associated with the highest respective correlation values, wherein M comprises a positive integer.

13. The method of claim 11, wherein at least a subset of the keywords included in the predetermined mappings between parsed data and keywords is determined from historical search logs.

14. The method of claim 11, wherein determining the plurality of composite correlation scores includes determining the first composite correlation score associated with the first candidate keyword based at least in part on a text-based correlation value between the first candidate keyword and a corresponding parsed element from the set of parsed elements.

15. The method of claim 11, wherein determining the plurality of composite correlation scores includes determining the first composite correlation score associated with the first candidate keyword based at least in part on a Gini index value associated with the first candidate keyword, wherein the Gini index value is used to reflect a probability that sets of product information that match the first candidate keyword are displayed among search results.

16. The method of claim 11, wherein determining the plurality of composite correlation scores includes determining the first composite correlation score associated with the a first candidate keyword based at least in part on a supply and demand index value associated with the first candidate keyword, wherein the supply and demand index value is used to reflect a supply and demand relationship relevant to the first candidate keyword.

17. The method of claim 11, wherein determining the plurality of composite correlation scores includes determining the first composite correlation score associated with the first candidate keyword based at least on a combination of a text-based correlation value between the first candidate keyword and a corresponding parsed element from the set of parsed elements, a Gini index value associated with the first candidate keyword, a supply and demand index value associated with the first candidate keyword, and the industry index value associated with the first candidate keyword.

18. The method of claim 11, further comprising cleaning the product title prior to parsing the product title into the set of parsed elements.

19. A computer program product for recommending keywords, the computer program product being embodied in a non-transitory computer readable storage medium and comprising computer instructions for:
- receiving a set of product information including a product title;
- extracting and parsing the product title into a set of parsed elements;
- finding a plurality of candidate keywords corresponding to at least a subset of the set of parsed elements based at least in part on stored predetermined mappings between parsed data and keywords;
- determining a plurality of composite correlation scores for corresponding ones of the plurality of candidate keywords, wherein determining the plurality of composite correlation scores includes determining a first composite correlation score associated with a first candidate keyword of the plurality of candidate keywords, wherein determining the first composite correlation score associated with the first candidate keyword includes determining an industry index value associated with the first candidate keyword, including:
  - determining a first similarity value between one or more industries associated with the first candidate keyword and one or more industries associated with sets of product information that are relevant to the first candidate keyword;
  - determining a second similarity value between the one or more industries associated with the first candidate keyword and one or more industries of one or more seller users associated with the sets of product information that are relevant to the first candidate keyword; and
  - determining the industry index value associated with the first candidate keyword based at least in part on a combination of the first similarity value and the second similarity value; and
- sorting at least a subset of the plurality of candidate keywords into a ranked list based on at least a subset of the plurality of composite correlation scores; and
- selecting a set of one or more keywords to recommend from the plurality of candidate keywords based at least in part on the ranked list.

* * * * *